(12) United States Patent
Jarnagin

(10) Patent No.: US 11,055,949 B2
(45) Date of Patent: Jul. 6, 2021

(54) CONTENT MANAGEMENT ON REMOTE DISPLAYS USING URL REWRITING

(71) Applicant: THE COCA-COLA COMPANY, Atlanta, GA (US)

(72) Inventor: Andrew Jarnagin, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 203 days.

(21) Appl. No.: 15/768,707

(22) PCT Filed: Oct. 14, 2016

(86) PCT No.: PCT/US2016/056934
§ 371 (c)(1),
(2) Date: Apr. 16, 2018

(87) PCT Pub. No.: WO2017/066503
PCT Pub. Date: Apr. 20, 2017

(65) Prior Publication Data
US 2018/0300982 A1    Oct. 18, 2018

Related U.S. Application Data

(60) Provisional application No. 62/242,552, filed on Oct. 16, 2015.

(51) Int. Cl.
*G07F 17/00* (2006.01)
*G06F 17/00* (2019.01)
(Continued)

(52) U.S. Cl.
CPC ....... *G07F 17/0014* (2013.01); *G05B 19/042* (2013.01); *G06F 16/9566* (2019.01); *G05B 2219/2645* (2013.01)

(58) Field of Classification Search
CPC ............. G07F 17/0014; G06F 16/9566; G05B 19/042; G05B 2219/2645
(Continued)

(56) References Cited

U.S. PATENT DOCUMENTS 6,230,150 B1 * 5/2001 Walker ................. G06Q 10/087
                                                       700/231
8,667,146 B2 * 3/2014 Agarwal ........... H04L 29/08846
                                                       709/228
(Continued)

FOREIGN PATENT DOCUMENTS

JP      2013-532340 T    8/2013
WO      2007111597 A1    10/2007

OTHER PUBLICATIONS

International Searching Authority, Korean Intellectual Property Office. International Search Report and Written Opinion. Application No. PCT/US2016/056934. dated Jan. 31, 2017. 13 pages.
(Continued)

*Primary Examiner* — Michael Collins
(74) *Attorney, Agent, or Firm* — Meunier Carlin & Curfman LLC

(57) ABSTRACT

Technologies are disclosed herein for providing content management for deploying and updating a fleet of resources. A system for providing content management may include a web server or other apparatus configured to receive a local content request from a local device of a fleet of resources, the local content request comprising a canonical uniform resource locator (URL) that uniquely identifies the local device. The web server may be further configured to analyze the local content request to determine if the URL matches one or more rewrite rules, formulate a response to the local content request based on the analyzing, and transmit the formulated response.

13 Claims, 6 Drawing Sheets

(51) Int. Cl.
  *G05B 19/042* (2006.01)
  *G06F 16/955* (2019.01)
(58) Field of Classification Search
  USPC ................................................ 700/231–244
  See application file for complete search history.

(56) References Cited

U.S. PATENT DOCUMENTS

| | | | | |
|---|---|---|---|---|
| 8,769,524 | B2* | 7/2014 | Bhullar | G06F 9/44521 717/173 |
| 9,003,393 | B2* | 4/2015 | Bhullar | G06F 16/23 717/173 |
| 2004/0070678 | A1 | 4/2004 | Toyama | |
| 2005/0155060 | A1* | 7/2005 | Sato | G06Q 30/02 725/42 |
| 2006/0020684 | A1* | 1/2006 | Mukherjee | H04L 67/2804 709/219 |
| 2006/0224470 | A1* | 10/2006 | Garcia Ruano | G06Q 20/102 705/26.1 |
| 2007/0101362 | A1* | 5/2007 | Spielman | H04N 21/47205 725/37 |
| 2007/0130594 | A1* | 6/2007 | Hidary | H04N 7/17318 725/86 |
| 2011/0021219 | A1 | 1/2011 | LeBlanc et al. | |
| 2011/0178973 | A1 | 7/2011 | Lopez et al. | |
| 2011/0202413 | A1* | 8/2011 | Stewart | G06Q 20/40 705/16 |
| 2013/0152070 | A1* | 6/2013 | Bhullar | G06F 16/23 717/173 |
| 2014/0101281 | A1 | 4/2014 | Jacoby et al. | |
| 2014/0114736 | A1* | 4/2014 | Kennedy | G06Q 30/0241 705/14.25 |
| 2014/0166749 | A1* | 6/2014 | Argue | G06Q 20/322 235/381 |
| 2014/0229439 | A1* | 8/2014 | Bhullar | G06F 16/23 707/626 |
| 2014/0280746 | A1* | 9/2014 | Johns | H04L 67/18 709/219 |
| 2015/0067029 | A1* | 3/2015 | Rashid | H04L 67/42 709/203 |
| 2015/0089384 | A1* | 3/2015 | Lewis | G06F 3/0482 715/745 |
| 2020/0344602 | A1* | 10/2020 | Li | G08B 5/222 |

OTHER PUBLICATIONS

Extended European Search Report and Search Opinion. Issued by the European Patent Office in counterpart European Application No. 16856230.4 dated Mar. 7, 2019. 8 pages.
European Search Report dated Mar. 11, 2020 for App. No. EP 16856230.
Japanese Patent Office—Office Action dated Aug. 31, 2020 for related Japanese Patent Application No. 2018-519473 with English Translation.
"HP Linux Imaging and Printing", Jan. 20, 2009, pp. 1-2, XP055751867, retrieved from the Internet: http://www.web.archive.org/web/20090120200819/http://hplipopensource.com/hplip-web/install/step4/cups/net.html.
Communication pursuant to Article 94(3) EPC for EP Application No. 16856230.4 dated Dec. 7, 2020.

* cited by examiner

CONTENT MANAGEMENT ON REMOTE DISPLAYS USING URL REWRITING

CROSS-REFERENCE TO RELATED APPLICATIONS

This application is a United States national phase application under 35 U.S.C. § 371 of International Patent Application No. PCT/US2016/056934 filed on Oct. 14, 2016, and claims the benefit of U.S. Provisional Patent Application Ser. No. 62/242,552 filed Oct. 16, 2015, both of which are expressly incorporated herein by reference.

TRADEMARKS

COCA-COLA® is a registered trademark of The Coca-Cola Company, Atlanta, Ga., U.S.A. Other names, symbols, designs, or logos used herein may be registered trademarks, trademarks, or product names of The Coca-Cola Company or other companies.

FIELD OF THE INVENTION

This invention relates to digital displays and human-machine interfaces, and in particular, relates to systems and methods for providing content management across a fleet of digital displays, human-machine interfaces, and other graphical displays and devices.

BACKGROUND

Generally, digital content can be distributed across a fleet of digital displays, human-machine interfaces, and other graphical displays and devices. The digital content may be generated and stored at each device during an install or repair procedure. For example, new or updated digital content may be transferred to an associated device via a computer-readable storage medium, such as a universal serial bus (USB) mass storage device. It follows that as a size of the fleet of devices increases, the cost and effort associated with updating the content increases dramatically. Furthermore, a total update time for managing content across the fleet of devices may increase difficulty in coordinating content changes in a timely manner, or with regard to a desired rollout period or targeted time for coordinated content updates.

The disclosure made herein is presented with respect to these and other considerations.

DETAILED DESCRIPTION

Figure 1:
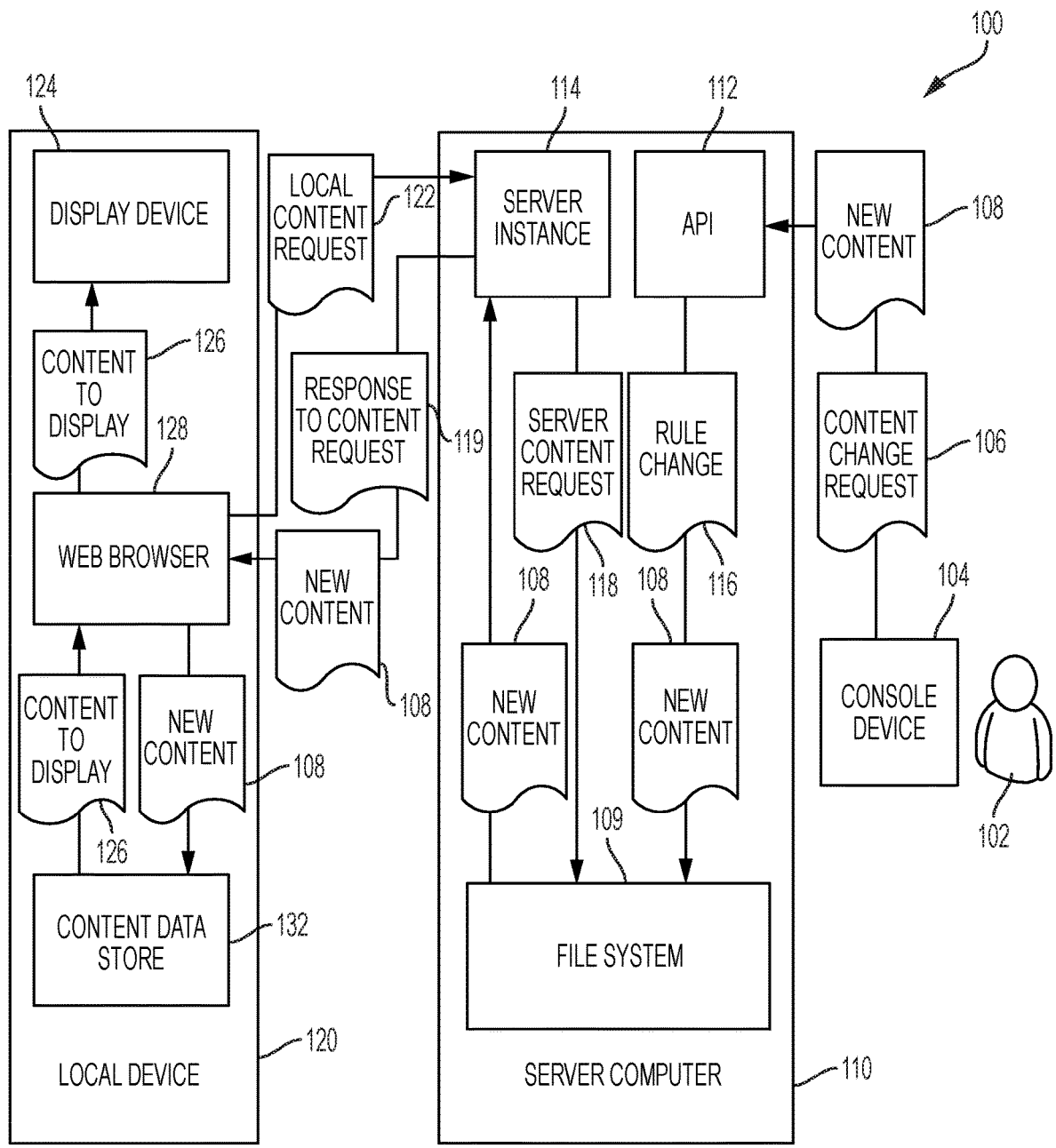
FIG. 1 is a system architecture diagram showing aspects of the configuration and operation of a system for content management, in one configuration presented herein.

As used herein, the terms "beverage forming dispenser", "product dispenser", "beverage dispenser", "dispenser apparatus", "vending device", "dispenser", and other variants of these terms may refer to a device which dispenses a product such as a beverage, can, bottle, container, or other beverage product.

As used herein, the terms "product" and "beverage", and their pluralized forms, are used synonymously, and particular features of the invention should not be limited in scope by the use of either term.

The following detailed description is directed to technologies for providing content management. Utilizing the technologies described herein, a server instance, Application Programming Interface (API), and associated program code can be implemented that provide functionality for deploying or updating content onto a fleet of resources.

Generally, the fleet of resources can include one or more local devices, a server computer, and a console or administrative device. The local device may be arranged to have a digital display or other graphical user interface. The digital display is capable of displaying digital content, such as, for example, advertisements, video, graphics, and other digital content. The local device may include a digital billboard, a hybrid analog/digital billboard, a beverage dispensing device, a vending device, a beverage cooler, and other devices equipped with at least one digital display or other display apparatus capable of displaying content as described herein. The local device may include a web browser or other arrangement of program code configured to receive, arrange, and display content according to an established standard protocol, such as the fifth revision of the Hypertext Markup Language (HTML5) and the Hypertext Transfer Protocol (HTTP). The web browser may also execute a web service configured to retrieve and/or update the digital content described herein. Additionally, the web browser may provide for execution of one or more programmable scripts, such a JavaScript via JavaScript Object Notation (JSON) capable of performing some of the operations described herein.

The digital content may be served from the server computer according to the methodologies presented herein. The server computer may be at least in periodic communication with the local device over a network or series of networks, such as the Internet. The periodic communication may be based on a fixed period or a variable period of time. Additionally, the periodic communication can include constant or consistent communication, according to some implementations. The server computer can spin up one or more server instances to process local content requests received from the one or more local devices. Generally, the local content requests are generated by local devices only, and are processed by a server computer or server instance configured to "listen" and/or monitor incoming local content requests.

The server instances may be arranged as a content delivery network (CDN). For example, a CDN is a system of distributed servers that deliver webpages and other content based on the local content requests. The local content requests may be arranged to identify a requesting local device, and the server instance may process the local content request to determine an appropriate response. For example, the server instance may return a manifest of resources to the local device, an index file for content to be displayed at the local device, new content to be updated or displayed at the local device, or other similar responses. The particular form of the response, manifest, index, content, and other possible transmissions between a server instance and a local device may be based on configuration data administered by the console device.

The console device is a suitable computing device or apparatus, such as an laptop computer, desktop computer, tablet computer, or other device. The console device may be used to issue content change requests and submit new or updated content to the server computer through an API exposed at the server instance. The API allows for particular content change requests to be relatively easily submitted through manipulation of a mapping database that maps canonical uniform resource locator (URL) information to desired content stored or maintained by the server computer. The API additionally facilitates submission of new content for storage/maintenance by the server computer that is also accessible by the server instance for distribution to local devices as described herein.

It should be appreciated that the functionality provided by the API and server instance may also be combined through use of other interface technologies and/or communication protocols without departing from the scope of this disclosure. For example, and without limitation, the interactions between the console device and server computer may be facilitated through a software or web interface not particularly termed an API. Other functionality may also be provided. Additional details regarding the various components and processes described above for implementing content management will be presented below with regard to FIGS. 1-6.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of a console device 104, a server computer 110, and a local device 120, for content management of content displayed at the local device 120, in one configuration presented herein. As shown in FIG. 1, and described briefly above, an administrator 102 of the console device 104 may develop content change requests 106 and new content 108 for distribution to one or more local devices.

Generally, the content change request 106 may be facilitated by a content management application or user interface executed by the console device 104. Although not illustrated, the content management application may be configured to allow relatively easy identification of particular local devices, content for distribution, and other attributes that allow easy distribution of content. The content management application may be embodied by any suitable computer program or segments of program code, and may be a general or customized user interface, according to some implementations.

The new content 108 may be generated at the console device 104 in some implementations. In other implementations, the new content may be generated external to the console device 104, and transferred to the console device 104. The transfer of the new content 108 to the console device may be facilitated through any desirable means, including direct transmission, transfer from a mass storage device, transfer over the Internet, transfer as an attachment over electronic mail, or by any other suitable means. The new content 108 may include content such as, for example, advertisements, video, graphics, user interface content for facilitating user interaction with the local device 120, and other digital content. The new content 108 may also include segments of non-digital content, or other forms of content not explicitly listed above. Upon generation or transfer of the new content at the console device 104, the administrator 102 may direct the content change request 106 and/or the new content 108 to the server computer 110.

As shown in FIG. 1, the server computer 110 may include at least one server instance 114 executing thereon and an Application Programming Interface (API) 112 being exposed by either the server computer 110 or the server instance 114. The server instance 114 may be any suitable computing instance. For example, and without limitation, suitable computing instances can include cloud-based computing instances provided by a service provider network.

Such cloud-based computing instances are relatively well known, and can include a variety of instance types provided by an operator of the service provider network. According to at least one implementation, the server instance 114 is an ELASTIC COMPUTE CLOUD (EC2) instance provided by AMAZON WEB SERVICES and/or AMAZON TECHNOLOGIES, INCORPORATED. The EC2 instance may include any desirable computing instance provided by the service provider network, including, for example, an on-demand computing instance capable of scaling computing resources based on a need or amount of traffic. Other computing instances may also be applicable depending upon any desired implementation of the technologies presented therein.

The API 112 may be a customized interface facilitating communication between the local device 120, the server computer 110, and the console device 104. Through access to routines described in the API 112, the console device 104 may provide the content change request 106 and the new content 108 to the server computer 110. Upon receipt of the content change request 106 and/or the new content 108, the API 112 may create a rule change 116 for storage at file system 109 of the server computer 110. In some implementations, the new content 108 may be loaded onto the file system 109 through other communication paths (not illustrated).

The file system 109 may include any suitable file system capable of storing new content 108 and a database or mapping of rules. The file system 109 and applicable portions of the file system 109 are described more fully with reference to FIG. 4. Additionally, although described and illustrated as a single file system, it should be appreciated that the file system 109 may comprise more than a single file system. Furthermore, the file system 109 may be an expandable file system. An expandable file system may include storage resources provided by a service provider network that can increase available storage based on a need or desire for more storage resources. One such file system is the SIMPLE STORAGE SOLUTION provided by AMAZON WEB SERVICES and/or AMAZON TECHNOLOGIES, INCORPORATED. Other file systems may also be applicable, depending upon any desired implementation.

Upon implementation of the rule change 116 in the file system 109 and storage of new content 108, the file system 109 may service server content requests 118 received from the server instance 114. For example, the server content request 118 may include a request for new content 108, a request for old content (not illustrated), or a request for any other information stored through file system 109. Upon receipt and processing of the server content request 118, the file system 109 may provide new content 108 to the server instance 114.

As another example, the API 112 may write a set of rewrite rules as a configuration file in the server instance 114 based on the rule change 116. Thereafter, the server instance 114 may execute the rewrite rules in the configuration file to rewrite a local content URL to point to the desired content for the local device 120 as specified in a mapping database. Rewrite rules and the mapping database are described in more detail with reference to FIG. 4.

Generally, the new content 108 may be operative to be displayed through the local device 120. According to one implementation, the local device 120 is a local device of a fleet of resources managed through the system 100. The local device 120 includes at least one display device 124 arranged to display content according to the technologies described herein. The display device 124 is capable of displaying digital content, such as, for example, advertisements, video, graphics, user interfaces, and other digital content including the new content 108. The display device 124 may also be capable of displaying analog content and may include other display types beyond typical digital displays. For example, although the display device 124 may include a traditional plasma display panel, liquid crystal display (LCD) panel, or other digital display panels, the display device 124 may also include hybrid analog/digital display panels comprising one or more moving portions actuated to enable a physically three-dimensional display. The display device 124 may also include other forms of displays including, for example, touch-sensitive displays, organic LED based displays, or any other suitable display or combination of displays.

As further illustrated in FIG. 1, the local device 120 may include a web browser 128 or other arrangement of program code configured to receive, arrange, and display content according to an established standard protocol, such as the fifth revision of the Hypertext Markup Language (HTML5) and the Hypertext Transfer Protocol (HTTP). The web browser 128 may also execute a web service configured to retrieve and/or update the digital content described herein. Additionally, the web browser 128 may provide for execution of one or more programmable scripts, such a JavaScript and transfer data via JavaScript Object Notation (JSON) capable of performing some of the operations described herein.

Generally, the web browser 128 may be arranged to generate a local content request 122 directed to the server instance 114 and/or the server computer 110. The local content request 122 may include a canonical uniform resource locator (URL) address that identifies a unique identification or ID for the local device 120. For example, the canonical URL may generally take the form of "http://server.com/local_device_ID". Other local devices among the fleet of resources may use the same canonical URL, but with a unique ID identifying the associated local device. For example, a second local device may use the canonical URL "http://server.com/local_device_ID_2". Accordingly, the local content request 122 may identify the local device 120 among the fleet of resources described herein. Upon receipt and processing of the local content request 122, the server instance 114 may formulate a response to the content request 119 based on the unique ID. The response to the content request 119 may include an index and a manifest of available resources or other information. Utilizing the response to content request 119, the web browser 128 may retrieve content to display 126 from a local content data store 132 arranged on the local device 120. The content to display 126 may be directed to the display device 124 for appropriate display. The content to display 126 may include the new content 108, according to some implementations. Furthermore, the content to display 126 may include previously cached content stored in the content data store 132. Thus, depending upon the particular arrangement of the response to content request 119, the web browser 128 and associated web service and/or scripting module, may direct the display device 124 to display new or updated content, or refresh or maintain display of current content.

As described above, the system 100 may provide for content management across a fleet of resources including a plurality of local devices (such as local device 120). The content may be generated or provided by an administrator 102 through a console device 104. The console device may utilize an exposed API 112 to submit content change requests 106 and new content 108. Thereafter, the server computer 110 may process local content requests 122 from any requesting local device 120 such that an appropriate response to content request 119 is generated. Additionally, new content 108 may be transmitted to the local device 120 for display through the display device 124. Hereinafter, the operation of the server instance 114 and server computer 110, and the operation of the local device 120, are described more fully with reference to FIGS. 2-5

Figure 2:
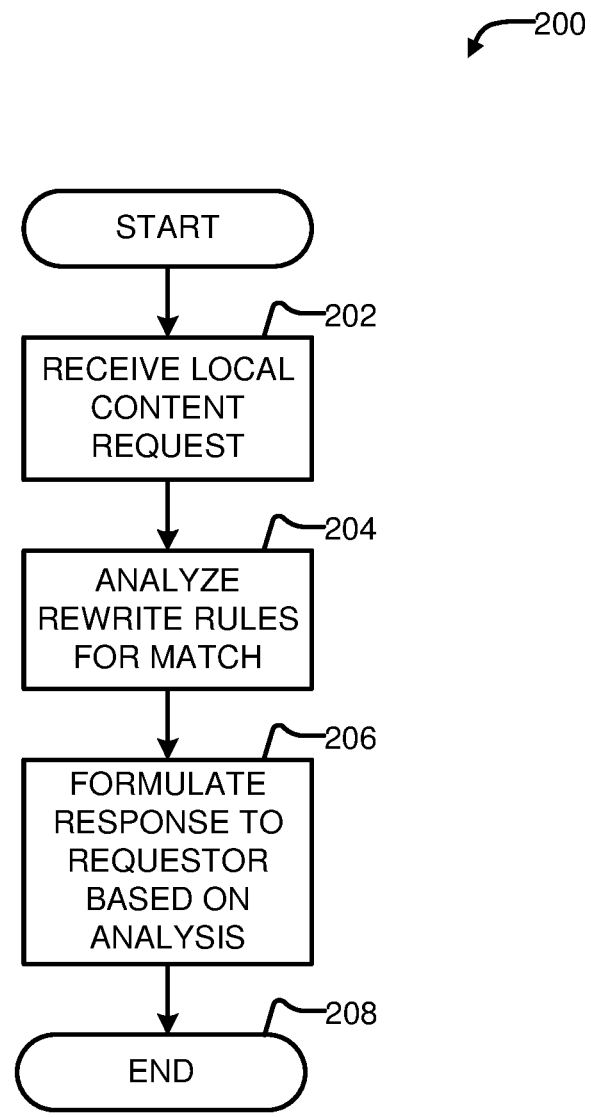
FIG. 2 is a flow diagram illustrating aspects of the operation of a server instance, in one configuration disclosed herein.

FIG. 2 is a flow diagram illustrating aspects of the operation of the server instance 114, in one configuration disclosed herein. As shown in FIG. 2, the method 200 includes operations performed by the server instance 114, or alternatively, an individual or distributed server system. The server instance 114 may receive a local content request 122, at block 202. As described above, the local content request 122 may be a request generated by the local device 120 and directed to the server instance 114. The local content request 122 may uniquely identify the local device 120 through use of a unique identifier. According to one implementation, the unique identifier is a canonical URL. Other unique identifiers may also be implemented.

Upon receipt of the local content request 122, the server instance 114 may analyze a set of rewrite rules to determine a matching unique identifier, at block 204. Upon determining the matching unique identifier, the server instance 114 may formulate a response to the requestor, the local device 120, based on the analysis, at block 206, and the method 200 may cease at block 208.

Analyzing the rewrite rules may include, for example, traversing and/or searching the set of rewrite rules to determine if a particular URL is listed for rewriting. Upon determining the appropriate rewriting for the URL, a manifest and/or index of resources for the URL may be returned in the formulated response. Additionally, new content 108 or updated content may be returned in the formulated response. Alternatively, if no match is found, a basic and/or default response may be generated that may include a basic content for display at the local device.

Figure 3:
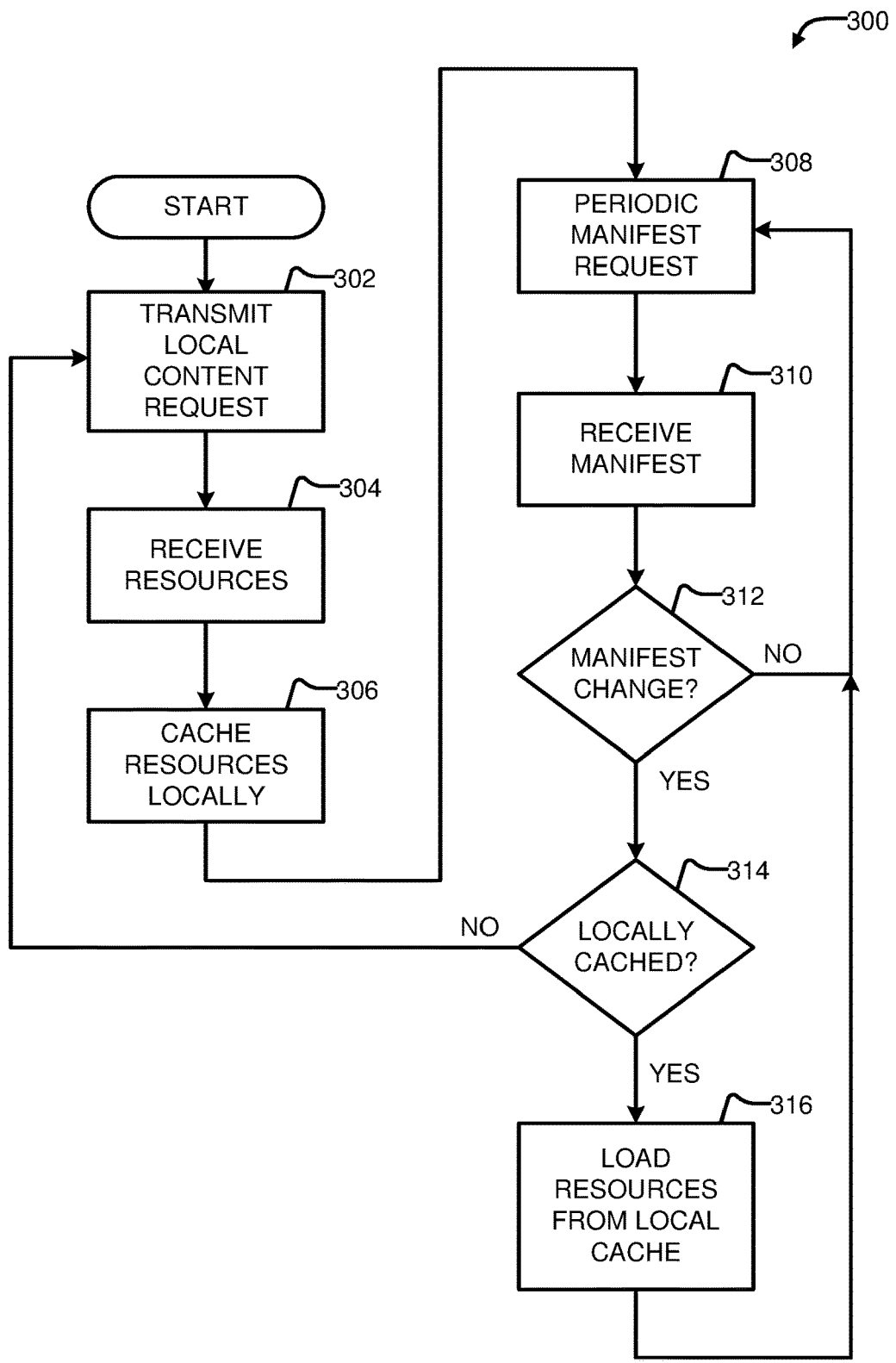
FIG. 3 is a flow diagram illustrating aspects of the operation of a local device, in one configuration disclosed herein.

As described above, the server instance 114 and/or a server or distributed server system may service local content requests received from local devices of a fleet of resources. Hereinafter, operation from the perspective of a local device is provided with reference to FIG. 3. FIG. 3 is a flow diagram illustrating aspects of the operation of the local device 120, in one configuration disclosed herein.

As illustrated, the method 300 includes operations performed by a web browser 128 or other application executed at the local device 120. The web browser 128 can generate and transmit a local content request 122, at block 302. The local content request 122 may be arranged as described above, and may include a unique identifier for the local device 120. Additionally, the local content request 122 may be arranged to request a particular set of resources, including digital content, new content 108, network resources, and other resources specified in a manifest. During operation, the set of resources may be retrieved via a plurality of resource requests. Accordingly, the web browser 128 may receive the requested resources at block 304, and cache the received resources locally, at block 306, The caching of resources may be facilitated by the content data store 132 of the local device 120.

Upon receiving and caching the resources, the web browser 128 may direct the display device 124 to display new content 108 and/or maintain displayed content. Additionally, the web browser 128 may periodically initiate a manifest request, at block 308. For example, a script may be one of the set of resources retrieved by the local content request 122. The script may execute a routine that causes the web browser 128 to periodically request the manifest or otherwise issue a request for the canonical URL. Generally, the manifest request may be included in a local content request 122, or it may be generated as an individual request. The manifest request may be periodic in that said manifest request is generated and transmitted by the web server 128 according to a predetermined, predefined, and/or desired schedule. For example, according to one implementation, the periodic manifest request is generated in a period of once per day. According to another implementation, the periodic manifest request is generated in a period of once per hour. According to another implementation, the periodic manifest request is generated in a period of once per a fixed number of hours. According to yet another implementation, the periodic manifest request is generated based on a fixed schedule assigned by the administrator 102. These examples of periodic manifest requests are non-exhaustive, and should not be construed as including every possible and/or desired period or generating manifest requests.

Responsive to generating and transmitting the periodic manifest request, the web browser 128 may receive a manifest directed to the local device 120, at block 310. The manifest may include a manifest of resources and content desired to be displayed at the local device 120. The manifest may also include other items, including items not to be displayed at the local device 120.

Upon receipt of the manifest, the web browser 128 may determine if there is a change between the received manifest from block 312, and a currently valid manifest of the web browser 128. If there are no changes, the web browser 128 may continue to maintain the display device 124 in a current or previous state, and may periodically generate and transmit manifest requests as described above.

Alternatively, if there is a change in the manifest, the web browser 128 may determine if resources in the manifest are locally cached, at block 314. If the resources are locally cached, the web browser may load the resources from the local cache and/or content data store 132, and iterate through operations 308-312 as described above. If the resources are not locally cached, the web browser 128 may generate a new local content request for at least one resource, at block 302. Thereafter, the web browser 128 may continue to perform operations 302-316 as described above, and update, refresh, and maintain the display device 124 with new or changing content.

As described herein, a web browser 128 or other application executing on a local device 120 may request resources including new content 108, and generate periodic manifest requests by which to coordinate a display of cached or new content at a display device 124. The cached content can be updated to include new or changing content based on the periodic manifest requests returning manifests differing from a current, valid manifest.

Additionally, if a manifest change is detected, but content is cached locally from a prior display configuration, the cached content may be loaded and displayed thereby reducing network bandwidth usage. Furthermore, if new content is desired to be displayed, the periodic manifest request facilitates coordinated downloading of the new content 108 to a local content data store of a local device. Thereafter, the new content 108 can be displayed through the display device 124. Hereinafter, facilitation of local content requests based on a set of rewrite rules and a mapping database is described more fully with reference to FIG. 4.

Figure 4:
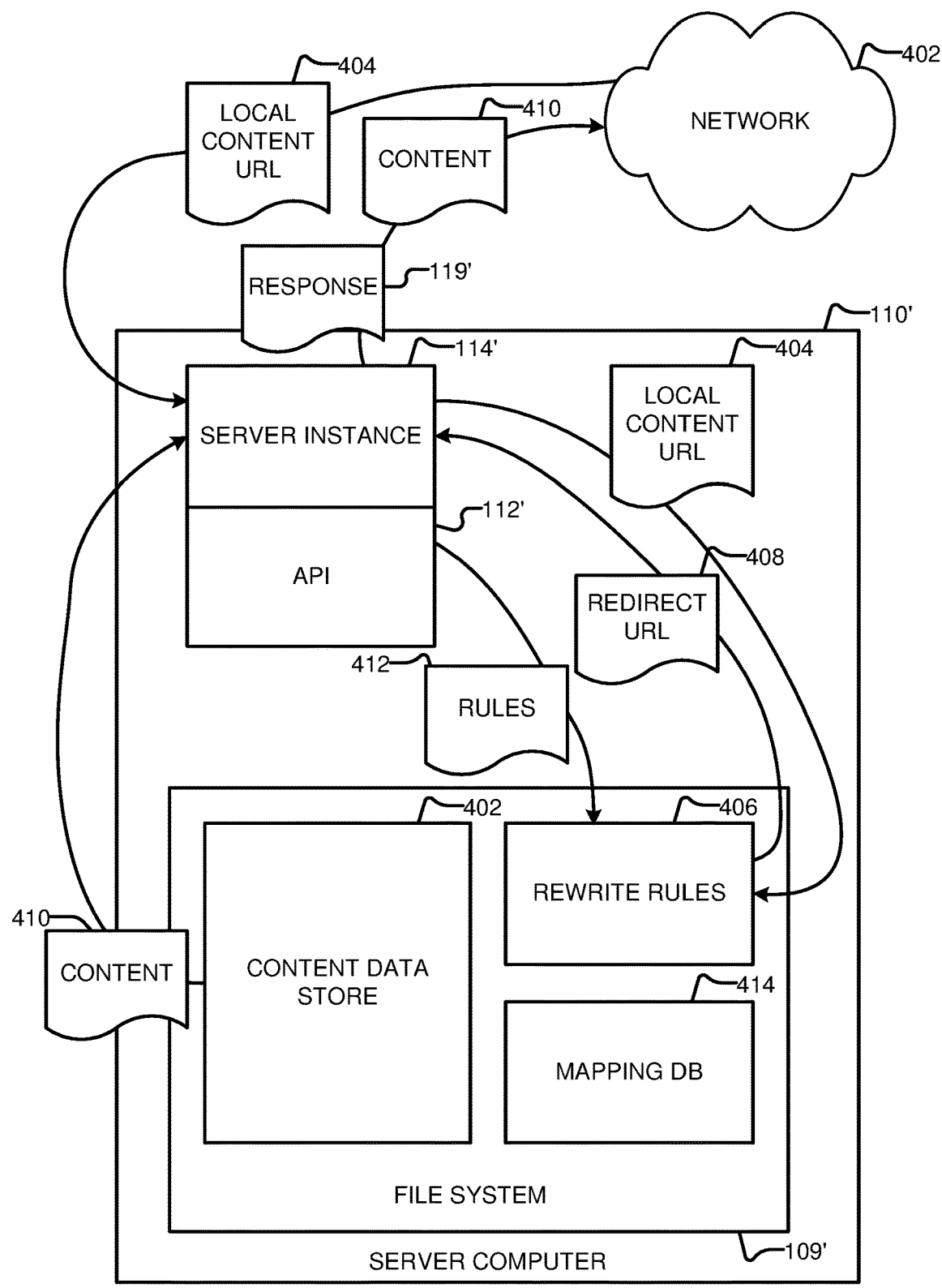
FIG. 4 is a diagram illustrating aspects of the operation of a server computer or other computing device, in one configuration disclosed herein.

FIG. 4 is a diagram illustrating aspects of the operation of a server computer 110' or other computing device, in one configuration disclosed herein. The server computer 110' may generally be substantially similar to the server computer 110 in both operation and function. The server computer 110' includes a file system 109' arranged similar to the file system 109. The file system 109' includes a content data store 402. The content data store 402 is a repository of new content 108, old content, and any other suitable data. The file system 109' further includes a set of rewrite rules 406 and a mapping database 414. The set of rewrite rules 406 may include a set, listing, database, or other arrangement of data stipulating the appropriate rules for rewriting a URL.

URL rewriting is a process by which an incoming request to access a resource through use of a first URL is rerouted to a second URL. The second URL is different than the first URL, according to one implementation. However, under some circumstances, the second URL may be the same as the first URL as well. According to at least one implementation, the "mod_rewrite" function available through the APACHE HTTP SERVER and/or from THE APACHE SOFTWARE FOUNDATION is used to facilitate URL rewriting. Other forms of URL rewriting may also be applied to the concepts and technologies disclosed herein.

The file system 109' further includes a mapping database 414. The mapping database 414 may be a database storing mapping information related to a particular content and a particular local device. For example, the mapping information stored at the mapping database 414 stipulates which stored content is mapped to which local device. More than one local device can be mapped to the same content. Furthermore, each local device can be mapped to different individualized or customized content. Additionally, any combination of mappings may be applicable depending upon the particular fleet of resources deployed.

The server computer 110' also includes a server instance 114' executing thereon. The server instance 114' may expose API 112' for use by a console device, such as console device 104. The server instance 114' may be substantially similar to server instance 114 and the API 112' may be substantially similar to API 112.

Generally, the server instance 114' may be in operative communication with a network 402 or series of interconnected networks such as the Internet. The server instance 114' may be configured to receive a local content URL 404 or a local content request 122. The local content URL 404 may be a canonical URL uniquely identifying a requestor such as a local device 120. The server instance 114' may examine the rewrite rules 406 and the mapping database 414 to determine if a rewritten URL 408 is associated with the local device 120. For example, rewrite rule 412 may be applied to the rewrite rules 406 and/or mapping database 414 upon direction by an appropriate console device 104 and/or administrator 102.

As another example, the API 112' may write the rewrite rules 406 as a configuration file in the server instance 114'. Thereafter, the server instance 114' may execute the rewrite rules in the configuration file to rewrite the local content URL 404 to point to the desired content for the local device 120 as specified in the mapping database 414.

Upon retrieving the appropriate rewrite URL 408, the server instance 114' may access content data store 402 to retrieve content 410. The server instance 114' may formulate an appropriate response 119' and transmit the response 119' and the content 110 through the network 402 for receipt by the local device identified in the local content URL 404. In this manner, the server instance 114' and server computer 110' receive and process local content URLs and local content requests to determine appropriate responses 119'. The responses and/or content 410 may then be transmitted to associated local devices 120. Hereinafter, operational characteristics of a local device are described more fully with reference to FIG. 5.

Figure 5:
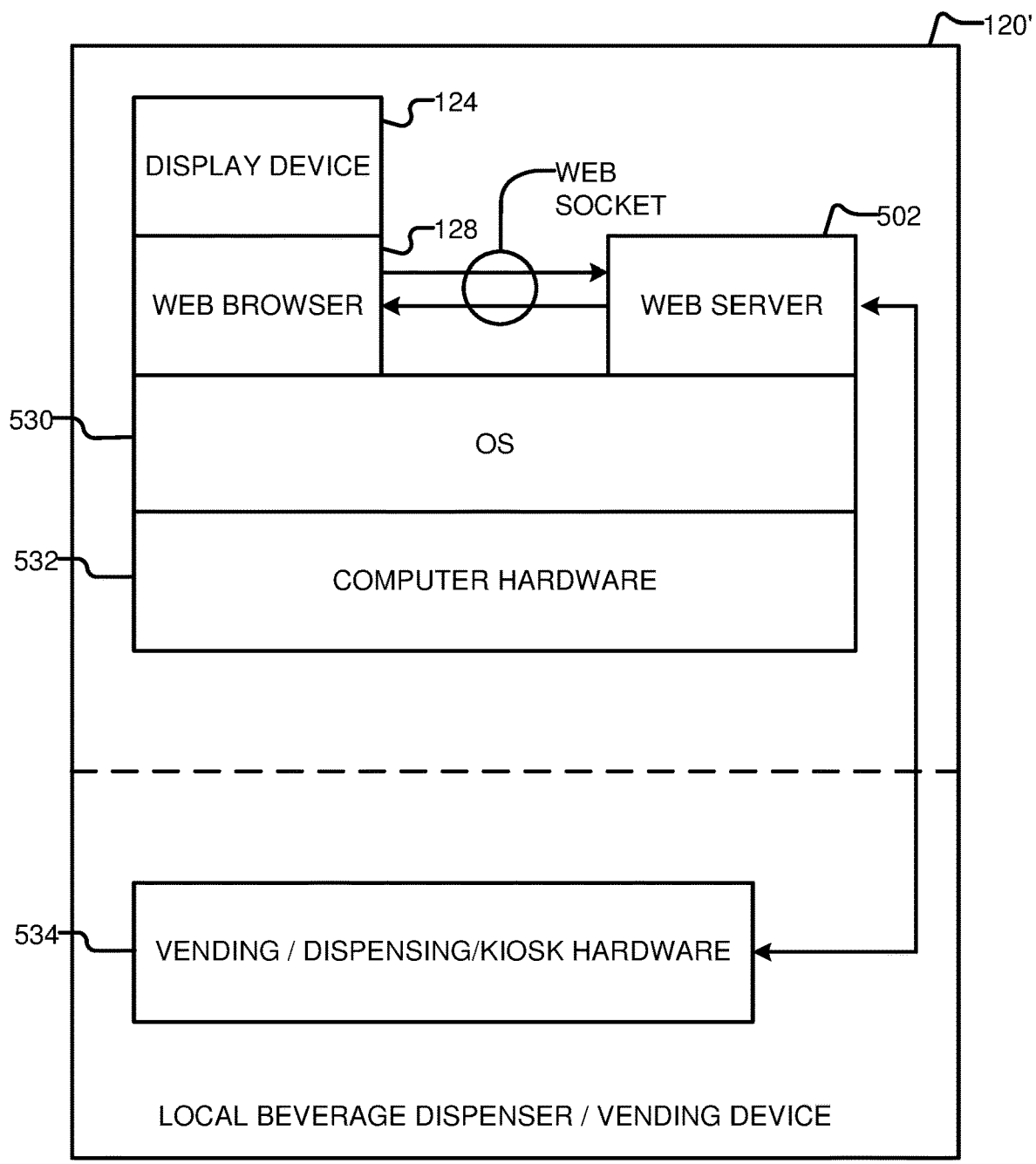
FIG. 5 is a diagram illustrating aspects of a local device, in one configuration disclosed herein.

FIG. 5 is a diagram illustrating aspects of a local device 120', in one configuration disclosed herein. As shown, the local device 120' may be a local beverage dispenser, vending device, or any other kiosk device having a display device 124 for displaying content. The local device 120' may also be arranged as a billboard, advertisement screen, or other similar device. Additionally, the local device 120' may be arranged as a hybrid analog/digital display device such as an actuated billboard with one or more moveable features and/or display devices 124.

Generally, the local device 120' may include an operating system (OS) 530 deployed on computer hardware 532. Operation of an OS and computer hardware is described with reference to FIG. 6. The local device 120' may also include vending and/or dispensing and/or other kiosk-specific hardware 534 in operative communication with a web server 502 executing through the OS 530. The web server 502 may be a standalone web service configured to communicate with the vending/dispensing hardware 534 and the web browser 128. The web server 502 may, for example, communicate with the web browser 128 via secure web sockets, according to one implementation or via HTTP in another.

As the web server 502 and the web browser 128 are separate services, direct communication between the web browser 128, which may be connected to a network, is avoided. Accordingly, security of the operation of the vending/dispensing hardware 534 is increased while still facilitating network communications to update content presented through the display device 124. Thus, interactions between a user and an interface presented at the display device 124 are presented by the web browser 128 to the web server 502. These interactions are processed by the web server 502 to direct the vending/dispensing hardware 534 to dispense beverage products or other products according to a process that is not affected by malfunctions at the display device 124 or tampering by a user. Furthermore, information related to the dispensing through the hardware 534 may also be displayed at display device 124 as the web browser 128 may direct the display device 124 to display consumer messages about a transaction or an interaction in progress. Other information related to the operation of the local device 120 may also be displayed through the display device 124.

As described above, a web browser implementing a web service, illustrated as browser 128, can be implemented that provides functionality for updating and/or managing content across one or more local devices with limited or no physical interaction required at each local device. Alternative implementations of the particular examples described above are also possible, and are within the scope of this disclosure. Furthermore, different operating environments and computing devices may be used to implement some or all of the functionality described herein. Hereinafter, non-limiting examples of a possible operating environment and computing device are described more fully with reference to FIG. 6.

Figure 6:
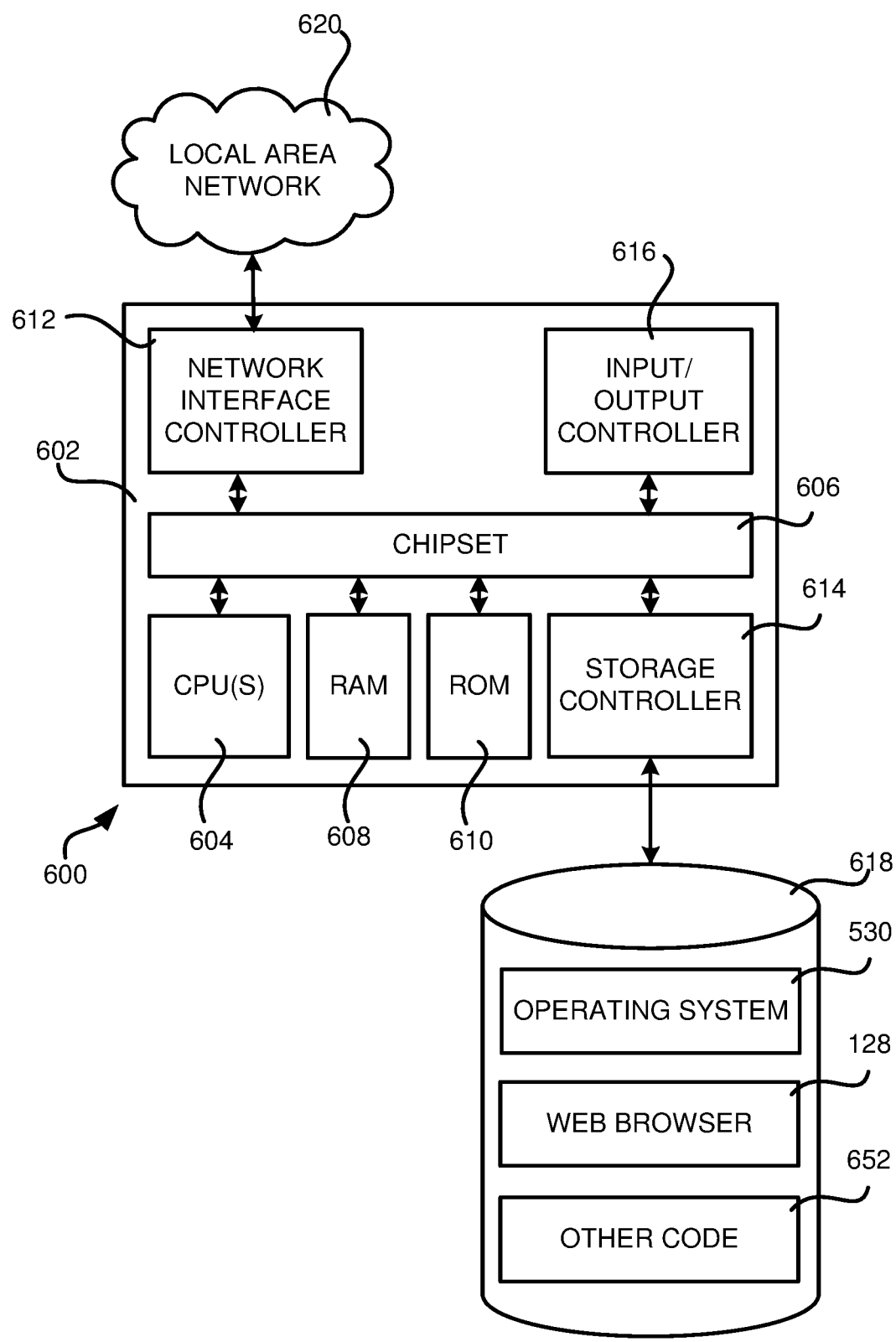
FIG. 6 is a computer architecture diagram showing an illustrative computer hardware architecture for implementing a computing device that might be utilized to implement aspects of the various technologies presented herein.

FIG. 6 shows an example computer architecture for a computer 600 capable of executing program components for implementing the various elements in the manner described above. The computer architecture shown in FIG. 6 illustrates a conventional server computer, workstation, desktop computer, laptop, tablet, network appliance, e-reader, smartphone, or other computing device, and may be utilized to execute any of the software components presented herein. For example, the computer architecture shown in FIG. 6 may be utilized to execute software components for providing the functions and features described with reference to FIGS. 2-5 and/or related functionality. The computer architecture shown in FIG. 6 might also be utilized to implement a console device 104 or any other of the computing systems described herein, including computer hardware 532.

The computer 600 includes a baseboard 602, or "motherboard," which is a printed circuit board to which a multitude of components or devices may be connected by way of a system bus or other electrical communication paths. In one illustrative configuration, one or more central processing units (CPUs) 604 operate in conjunction with a chipset 606. The CPUs 604 may be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computer 600. The chipset 606 may further provide an interface to a computer-readable storage medium such as a read-only memory (ROM) 610 or non-volatile RAM (NVRAM) for storing basic routines that help to startup the computer 600 and to transfer information between the various components and devices. The ROM 810 or NVRAM may also store other software components necessary for the operation of the computer 600 in accordance with the configurations described herein.

The computer 600 may operate in a networked environment using logical connections to remote computing devices and computer systems through a network, such as the local area network 620 or network 402. The chipset 606 may include functionality for providing network connectivity through a NIC 612, such as a gigabit Ethernet adapter. The NIC 612 is capable of connecting the computer 600 to other computing devices over the network 620. It should be appreciated that multiple NICs 612 may be present in the computer 600, connecting the computer to other types of networks and remote computer systems.

The computer 600 may be connected to a mass storage device 618 that provides non-volatile storage for the computer. The mass storage device 618 may store system programs, application programs, other program modules, and data, which have been described in greater detail herein. The mass storage device 618 may be connected to the computer 600 through a storage controller 614 connected to the chipset 606. The mass storage device 618 may consist of one or more physical storage units. The storage controller 614 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 600 may store data on the mass storage device 618 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 618 is characterized as primary or secondary storage, and the like.

For example, the computer 600 may store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular discrete component in a solid-state storage unit. Other transformations of physical media are possible without departing from the spirit and scope of the present description, with the foregoing examples provided only to facilitate this description. The computer 600 may further read information from the mass storage device 618 by detecting the physical states or characteristics of one or more particular locations within the physical storage units.

In addition to the mass storage device 618 described above, the computer 600 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

The mass storage device 618 may store an operating system 530 utilized to control the operation of the computer 600. According to one configuration, the operating system includes at least one of the LINUX operating system, the WINDOWS® SERVER operating system from MICROSOFT Corporation, and the UNIX operating system or one of its variants. It should be appreciated that other operating systems may also be utilized. The mass storage device 618 may store other system or application programs and data utilized by the computer 600, such as the web browser 128, the server instance 114, the API 112, and/or any of the other software components and data described above. The mass storage device 618 might also store other programs and data 652 not specifically identified herein.

In one configuration, the mass storage device 618 or other computer-readable storage media is encoded with computer-executable instructions which, when loaded into the computer 600, transform the computer from a general-purpose computing system into a special-purpose computer capable of implementing the configurations described herein. These computer-executable instructions transform the computer 600 by specifying how the CPUs 604 transition between states, as described above. According to one configuration, the computer 600 has access to computer-readable storage media storing computer-executable instructions which, when executed by the computer 600, perform the various routines described above with regard to FIGS. 1-5. The computer 600 might also include computer-readable storage media for performing any of the other computer-implemented operations described herein.

The computer 600 may also include one or more input/output controllers 616 for receiving and processing input from a number of input devices, such as a keyboard, a mouse, a touchpad, a touch screen, a capacitive input device, or other type of input device. Similarly, the input/output controller 616 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for providing content management have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium having computer executable instructions stored thereupon which, when executed by a server computer, cause the server computer to:
monitor communications over a network for receipt of periodic manifest requests from a fleet of local devices;
formulate a first response to the periodic manifest requests by preparing a manifest of resources available on the server;
transmit the manifest to respective local devices identified in respective manifest requests;
receive a new local content request, for desired content identified on the manifest, from at least one of the respective local devices, wherein a respective periodic manifest request and the local content request comprise a canonical uniform resource locator (URL) uniquely identifying the at least one local device; and
transmit a second response and the desired content to the at least one local device, wherein the desired content updates vending machine hardware that dispenses a food or beverage product responsive to manipulation of the desired content on the at least one local device.

2. An apparatus comprising:
a processor;
a display device in operative communication with the processor;
a network interface controller for configuring the apparatus as a local device on a network relative to a server on the network;
a non-transitory computer-readable storage medium having instructions stored thereupon which are executable by the processor and which, when executed, cause the processor to execute a web service configured to:
generate a periodic manifest request;
periodically transmit the periodic manifest request to the server;
receive, over the network, a manifest of resources available at the server;
generate a new local content request, the new local content request comprising a new request for desired content that identifies selected resources from the manifest, wherein the periodic manifest request and the local content request comprise a canonical uniform resource locator (URL) uniquely identifying the local device on the network;
receive the desired content from the server; and
direct the display device to display the desired content;
wherein the apparatus further comprises vending machine hardware in operative communication with the processor, and
wherein the vending machine hardware is configured to dispense a food or beverage product responsive to manipulation of the desired content on the display device.

3. The apparatus of claim 2, further comprising beverage fountain dispensing hardware in operative communication with the processor, wherein the beverage fountain dispensing hardware is configured to dispense a beverage responsive to manipulation of the desired content on the display device.

4. The apparatus of claim 2, wherein the web service is a first web service, and wherein the non-transitory computer-readable storage medium has further instructions stored thereupon which are executable by the processor and which, when executed, cause the processor to execute a second web service configured to:
communicate with the first web service over web sockets or Hypertext Transfer Protocol (HTTP).

5. The apparatus of claim 4, wherein the first web service is configured to direct the second web service to dispense a food or beverage product.

6. The apparatus of claim 2, further comprising a local content data store in operative communication with the processor, and wherein the web service is further configured to:
cache the desired content at the local content data store.

7. The apparatus of claim 6, wherein the web service is further configured to:
determine if a received manifest has changed from a current manifest; and
responsive to determining that the current manifest has changed, determining if resources identified in the received manifest are cached at the local content data store.

8. The apparatus of claim 7, wherein the web service is further configured to:
responsive to determining that the resources identified in the manifest are cached at the local content data store, loading the resources from the local content data store.

9. The apparatus of claim 7, wherein the web service is further configured to:
responsive to determining that the resources identified in the received manifest are not cached at the local content data store, generating the new local content request requesting the selected resources identified in the received manifest.

10. A computer-implemented method for providing content management for a fleet of resources, the method comprising performing computer-implemented operations to:
expose an application programming interface (API) to a console device, the API facilitating transmission of new content to one or more local devices in the fleet of resources;
receive a content change request from the console device identifying at least one local device of the one or more local device to receive the new content;
receive the new content;
update a manifest that identifies the new content on the server;

monitor communications over a network for receipt of periodic manifest requests from a fleet of local devices;

transmit the manifest, as updated, to respective local devices identified in respective periodic manifest requests;

receive a new local content request for at least one portion of the new content identified on the manifest from at least one of the respective local devices, wherein the manifest request and a respective local content request comprise a canonical uniform resource locator (URL) uniquely identifying the at least one local device;

transmit the at least one portion of the new content to the at least one local device, wherein the at least one portion of the new content updates vending machine hardware that dispenses a food or beverage product responsive to manipulation of the at least one portion of the new content on the at least one local device; and direct a display device connected to the local device to display the at least one portion of the new content.

11. The computer-implemented method of claim 10, wherein the new content comprises advertising content, graphical content, or video content.

12. The computer-implemented method of claim 10, wherein the one or more local devices comprise vending devices, beverage fountain dispensing devices, and digital billboard devices.

13. The computer-implemented method of claim 10, wherein the API further facilitates URL rerouting through Hypertext Transfer Protocol.

\* \* \* \* \*